(12) United States Patent
Ort et al.

(10) Patent No.: US 12,497,940 B2
(45) Date of Patent: Dec. 16, 2025

(54) METHOD OF REFURBISHING AN ENERGY CONVERSION FACILITY AND REFURBISHED ENERGY CONVERSION FACILITY

(71) Applicant: Voith Patent GmbH, Heidenheim (DE)

(72) Inventors: Thomas Ort, York, PA (US);
Veerandra Chakkaravarthy Andichamy, Timonium, MD (US);
Rebecca Fuhrman, York, PA (US);
Kayli Rentzel, Mount Woilf, PA (US)

(73) Assignee: Voith Patent GmbH, Heidenheim (DE)

( * ) Notice: Subject to any disclaimer, the term of this patent is extended or adjusted under 35 U.S.C. 154(b) by 0 days.

(21) Appl. No.: 18/884,785

(22) Filed: Sep. 13, 2024

(65) Prior Publication Data
US 2025/0012248 A1    Jan. 9, 2025

Related U.S. Application Data

(63) Continuation of application No. PCT/EP2023/051498, filed on Jan. 23, 2023.
(Continued)

(51) Int. Cl.
F03B 11/00 (2006.01)
F03B 3/12 (2006.01)
F03B 11/04 (2006.01)

(52) U.S. Cl.
CPC ............ *F03B 11/002* (2013.01); *F03B 3/126* (2013.01); *F03B 11/04* (2013.01)

(58) Field of Classification Search
None
See application file for complete search history.

(56) References Cited

U.S. PATENT DOCUMENTS 3,305,215 A * 2/1967 Swiecicki ............ F03B 11/002
                                                    261/87
4,924,842 A    5/1990 Rao et al.
(Continued)

FOREIGN PATENT DOCUMENTS

CH          310028      9/1955
EP       1 209 356 A1   5/2002
(Continued)

OTHER PUBLICATIONS

Tang—CN-203476593-U + machine translation (Year: 2014).*
(Continued)

*Primary Examiner* — Juan G Flores
(74) *Attorney, Agent, or Firm* — TAYLOR & EDELSTEIN, PC

(57) ABSTRACT

A method of refurbishing a facility for converting hydraulic energy into electrical energy including the following steps: providing a first cover plate, a second cover plate, a first opening located at an inner head cover, a second opening located at a hub, a third opening located at a runner; connecting the first cover plate to the inner head cover; connecting the second cover plate to the hub, wherein the first cover plate and the second cover plate surround an axis, and a part of an outer surface of the inner head cover, a part of an outer surface of the hub, an inner surface of the first cover plate, and an inner surface of the second cover plate are confining an annular shaped space.

11 Claims, 10 Drawing Sheets

Related U.S. Application Data

(60) Provisional application No. 63/320,325, filed on Mar. 16, 2022.

(56) References Cited

U.S. PATENT DOCUMENTS

| | | | |
|---|---|---|---|
| 5,924,842 A | 7/1999 | Beyer et al. | |
| 10,544,774 B2 * | 1/2020 | Stummer | F03B 3/125 |
| 2018/0363465 A1 * | 12/2018 | Stummer | F03B 11/002 |
| 2021/0364014 A1 | 11/2021 | Young | |

FOREIGN PATENT DOCUMENTS

| | | | | |
|---|---|---|---|---|
| FR | 1203142 | | 1/1960 | |
| GB | 2497763 A | * | 6/2013 | F03B 11/002 |

OTHER PUBLICATIONS

Notification of Transmittal of the International Search Report and the Written Opinion of the International Searching Authority, or the Declaration dated May 4, 2023 for International Patent Application No. PCT/EP2023/051498 (13 pages).

* cited by examiner

METHOD OF REFURBISHING AN ENERGY CONVERSION FACILITY AND REFURBISHED ENERGY CONVERSION FACILITY

CROSS REFERENCE TO RELATED APPLICATIONS

This is a continuation of PCT application no. PCT/EP2023/051498, entitled "METHOD OF REFURBISHING AN ENERGY CONVERSION FACILITY AND REFURBISHED ENERGY CONVERSION FACILITY", filed Jan. 23, 2023, which is incorporated herein by reference. PCT application no. PCT/EP2023/051498 claims priority to U.S. provisional patent application Ser. No. 63/320,325, entitled "METHOD OF REFURBISHING AN ENERGY CONVERSION FACILITY AND REFURBISHED ENERGY CONVERSION FACILITY", filed Mar. 16, 2022, which is incorporated herein by reference.

BACKGROUND OF THE INVENTION

1. Field of the Invention

The present invention relates to a facility for converting hydraulic energy into electrical energy.

2. Description of the Related Art

In the field of converting hydraulic energy into electrical energy, the use of axial flow turbines is known. Such an axial flow turbine includes a runner which is movable about an axis, and which is rigidly connected to a drive shaft. The runner includes a hub and a multitude of blades connected to the hub. In the case of a so-called propeller type turbine the blades are fixedly connected to the hub. In the case of a so-called Kaplan type turbine the blades are pivot-mounted to the hub. A facility for converting hydraulic energy into electrical energy using an axial flow turbine includes a so-called inner head cover which is located adjacent to the hub and surrounds the drive shaft. Usually within the inner head cover a shaft seal and at least one bearing are located.

In the field of converting hydraulic energy into electrical energy, it is known that discharging gas into the water flow path in the region of the runner offers many benefits e.g., avoidance of cavitation, reduction of vibrations, improvement of efficiency at low water flow and increase of dissolved oxygen in the water passing the turbine. Of course, to achieve the later mentioned benefit the gas being discharged must contain oxygen.

In prior art several ways for discharging gas into the water passing the runner of a facility for converting hydraulic energy into electrical energy have been proposed. For example, U.S. Pat. No. 5,924,842 discloses feeding air via hollow coupling bolts (see FIG. 26) or a hollow drive shaft into the hub of an axial flow turbine (see FIG. 27). CH 310028 discloses a way for discharging air into the water passing the runner including channels arranged in the inner head cover structure, which open into an annular chamber, which is in communication with the inlet-side flow space of the runner through bores. The annular chamber also communicates through holes with an annular space in the runner hub, from which channels open out into the water flow space at various points on the runner hub.

Equipping an existing facility for converting hydraulic energy into electrical energy with a way for discharging gas into the water passing the runner known from prior art while refurbishing the facility involves the exchange or modification of many parts of the facility.

What is needed in the art is an alternative method of equipping an existing facility for converting hydraulic energy into electrical energy with a way for discharging gas into the water passing the runner while refurbishing the facility.

SUMMARY OF THE INVENTION

The present invention relates to a method of refurbishing a facility for converting hydraulic energy into electrical energy, and such a refurbished facility. The present invention provides an alternative method of equipping an existing facility for converting hydraulic energy into electrical energy with a way for discharging gas into the water passing the runner while refurbishing the facility. Thanks to the present invention, only a very small amount of effort has to be spent for exchange or modification of parts during refurbishing of the facility.

The disclosure of the present invention includes the Items that follow:

Item 1. The present invention provides a method of refurbishing a facility for converting hydraulic energy into electrical energy,
  wherein this refurbished facility includes:
    a water passage,
    a turbine with a runner of the axial flow type located within the water passage and moveable around an axis and belonging to a rotatable part of the turbine and including a hub and several blades connected to the hub,
    a drive shaft connected to the runner,
    an inner head cover located adjacent to the hub and surrounding the drive shaft and belonging to the non-rotatable part of the turbine;
  this method being characterized in that it includes the following steps:
    Providing a first cover plate,
    Providing a second cover plate,
    Providing a first opening located at the inner head cover,
    Providing a second opening located at the hub,
    Providing a third opening located at the runner,
    Connecting the first cover plate to the inner head cover,
    Connecting the second cover plate to the hub,
  whereas the first cover plate and the second cover plate are surrounding the axis, and a part of the outer surface of the inner head cover, a part of the outer surface of the hub, the inner surface of the first cover plate, and the inner surface of the second cover plate are confining an annular shaped space in order to allow a gas to flow from inside the inner head cover through the first opening, the annular shaped space, and the second opening and to be discharged through the third opening into the water passage during operation of the refurbished facility.

Item 2. The method according to Item 1, wherein the third opening is located at a bottom of the hub.

Item 3. The method according to Item 1, wherein the third opening is located at a side of the hub between the blades.

Item 4. The method according to Item 1, wherein the method includes the following steps:
  Providing a gas passage within one of the several blades,
  Providing an inlet aperture,
and the third opening is located at the blade including the gas passage, and the gas passage extends between the inlet aperture and the third opening in order to allow the gas discharging through the third opening into the water passage to flow through the gas passage by passing the inlet aperture.

Item 5. The method according to Item 4, wherein the third opening is located at a trailing edge of at least one of the several blades.

Item 6. The method according to Item 4, wherein the third opening is located at a periphery of at least one of the several blades.

Item 7. The method according to Item 4, wherein the third opening is located at a suction side of at least one of the several blades.

Item 8. The method according to one of the preceding Items, wherein the method includes the following step:
Providing a separated gas flow passage located within the hub.

Item 9. The method according to Item 8 in combination with one of the Items 1 to 3, wherein the separated gas flow passage extends between the second opening and the third opening in order to allow the gas discharging through the third opening into the water passage to flow through the separated gas flow passage.

Item 10. The method according to Item 8 in combination with one of the Items 4 to 6, wherein the separated gas flow passage extends between the second opening and the inlet opening in order to allow the gas discharging through the third opening into the water passage to flow through the separated gas flow passage.

Item 11. The present invention also includes a refurbished facility for converting hydraulic energy into electrical energy, wherein the facility is refurbished with a method according to one of the Items 1 to 10.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION OF THE INVENTION

Figure 1:
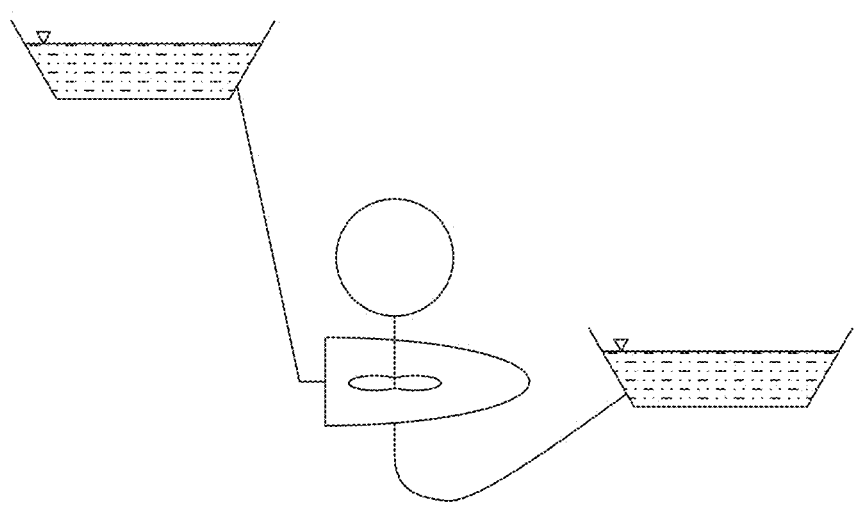
FIG. 1 is a facility for converting hydraulic energy into electrical energy.

FIG. 1 displays a facility for converting hydraulic energy into electrical energy in a very schematic way. The facility includes an upper and a lower reservoir of water, a turbine and a generator connected to the turbine. Of course, the reservoirs can be part of a body of flowing water such as a river. In this case the river upstream of the turbine is the upper reservoir and the river downstream of the turbine is the lower reservoir. The turbine includes a runner of the axial flow type moveable around an axis. Water flowing from the upper reservoir to the lower reservoir passes the turbine and causes the runner to rotate around its axis and the connected generator to generate electricity. The facility includes a water passage, and the water flows through the water passage, and the runner is located within the water passage.

Figure 2:
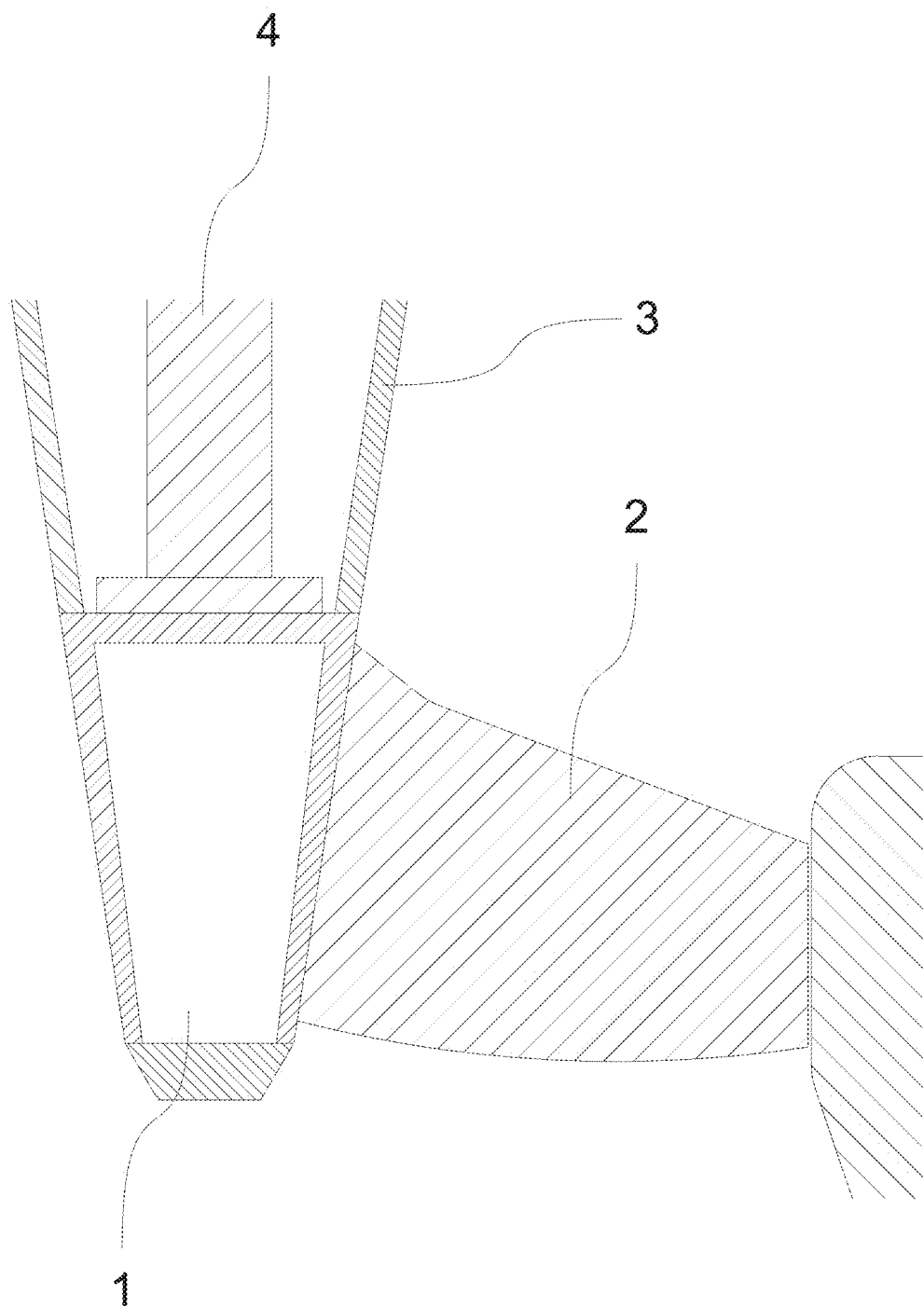
FIG. 2 is an axial flow turbine before refurbishment.

FIG. 2 displays a part of a turbine with a runner of the axial flow type before refurbishment. The runner includes a hub, which is designated by 1, and several blades connected to the hub 1. In FIG. 2 only one of the blades is shown and is designated by 2. In the case of a so-called propeller type turbine the blades are fixedly connected to the hub. In the case of a so-called Kaplan type turbine, the blades are pivot-mounted to the hub. The runner is connected to a drive shaft, which is designated by 4. The turbine includes an inner head cover which is located adjacent to the hub 1 and surrounds the drive shaft 4. The inner head cover is designated by 3.

Hub 1, blades 2, and drive shaft 4 belong to the rotatable part of the axial flow turbine, whereas the inner head cover 3 belongs to the non-rotatable part of the axial flow turbine.

The axial flow type runner shown in FIG. 2 is a propeller type runner, and the blades 2 are fixedly connected to the hub 1. Other axial flow type runners (Kaplan type runners) have blades 2, which are pivot-mounted to the hub 1. In this case the hub 1 is bulkier than a comparable propeller type hub 1 since it has to contain a way for pivoting the blades 2. Usually, the remaining inner space of a hub 1 of a Kaplan type runner is filled with oil or water.

Figure 3:
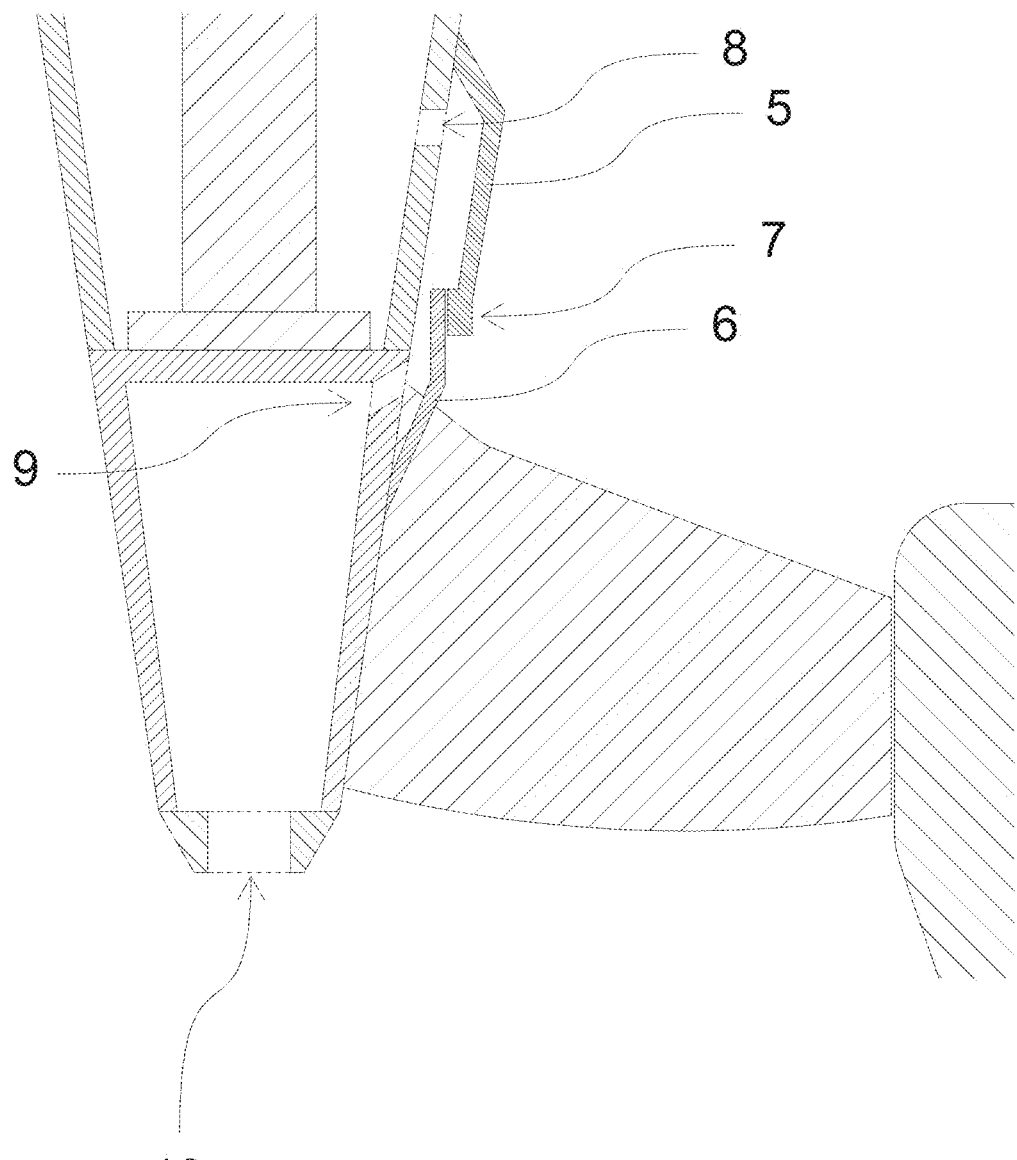
FIG. 3 is an axial flow turbine after refurbishment according to a first embodiment of the invention.

FIG. 3 displays the part of a turbine shown in FIG. 2 after refurbishment according to a first embodiment of the present invention. The refurbished turbine includes a first cover plate, which is designated by 5 and which is connected to the inner head cover 3, and a second cover plate, which is designated by 6 and which is connected to the hub 1. Both cover plates 5 and 6 are surrounding the axis of rotation of the runner, but for the sake of convenience FIG. 3 shows only the right part of the cover plates 5 and 6 respectively. Cover plates 5 and 6 meet at a seal, which is designated by 7. Since the first cover plate 5 is a non-rotatable part of the turbine and cover plate 6 is a rotatable part of the turbine, the seal 7 is a so-called rotatable seal.

In the arrangement shown in FIG. 3, a part of the outer surface of the head cover 3, a part of the outer surface of the hub 1, the inner surface of the first cover plate 5, and the inner surface of the second cover plate 6 are confining an annular shaped space, which is located outside of the original turbine and within the original water passage.

The refurbished turbine includes a first opening located at the inner head cover 3 leading from the inside of the inner head cover 3 to the annular shaped space. The first opening is designated by 8. The refurbished turbine can include more than one first opening 8. The refurbished turbine includes a second opening located at the hub 3 leading from the annular shaped space into the inside of the hub 3. The second opening is designated by 9. The second opening 9 is located near the top of the hub 1. The refurbished turbine can include more than one second opening 9. The refurbished turbine includes a third opening, which is located at the runner and is designated by 10. The third opening can be located at various parts of the runner. In any case the third opening 10 is configured to allow gas flowing from inside of the runner into the water passage surrounding the runner. In the embodiment according to FIG. 3 the third opening 10 is located at the bottom of the hub. The third opening 10 could be located at any suited part of the hub, e.g., in the region between the blades 2. The refurbished turbine can include more than one third opening 10.

Figure 4:
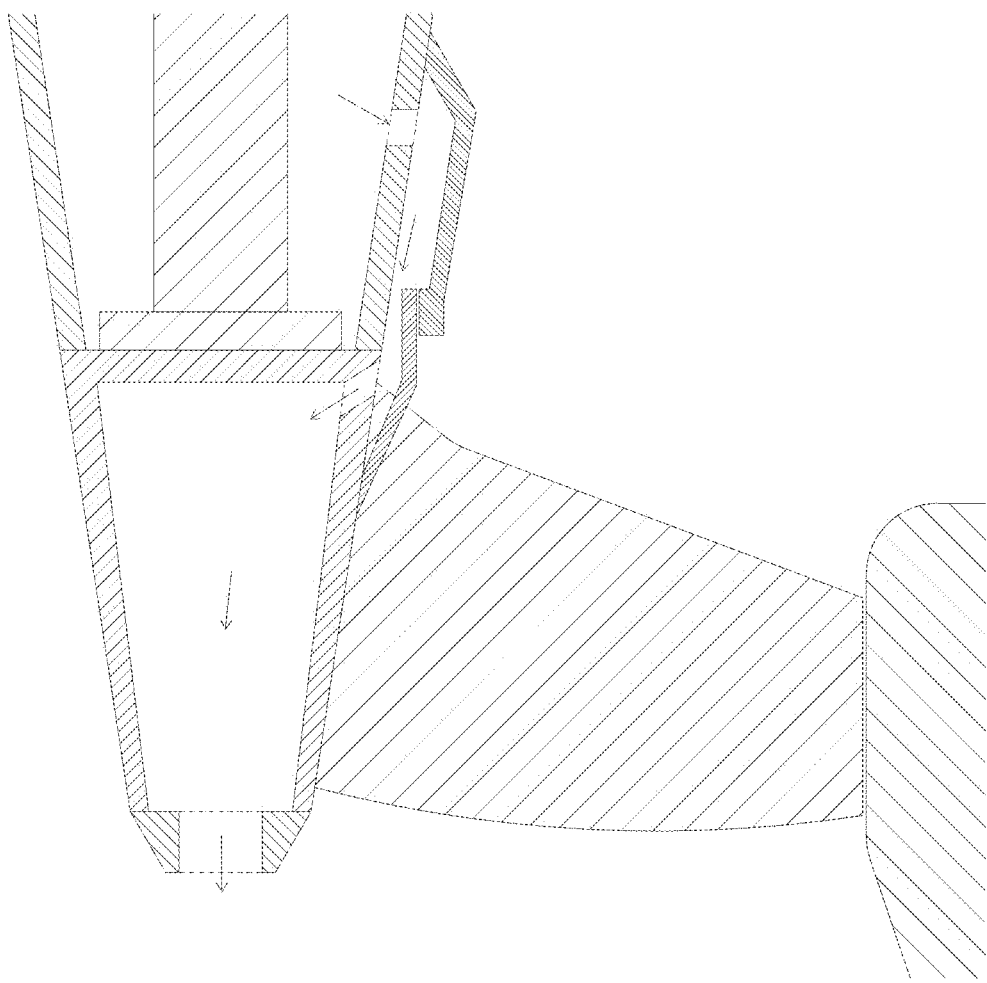
FIG. 4 is a gas flow path in the refurbished turbine according to FIG. 3.

The arrangement according to FIG. 3 enables the refurbished turbine to discharge gas into the water passage. FIG. 4 shows the flow path of the discharged gas whereas the flow path is indicated by the arrows. The gas enters the first opening 8 from inside the inner head cover 3. Through the first opening 8 it enters the annular shaped space and flows towards the second opening 9 through which it enters the hub 1. Then it passes the hub 1 and is discharged into the water passage via the third opening 10. The rotatable seal 7 mitigates water infiltration from the surrounding water passage.

It is clear that the gas has to be delivered to the inside of the inner head cover 3 before it can flow in the described manner. How this is achieved strongly depends on the detailed structure of the existing facility. In most cases the gas can be delivered into the inner head cover 3 by providing additional pipes and by using existing compartments inside the facility. The gas can be delivered using a compressor or just by the influence of atmospheric pressure.

Figure 5:
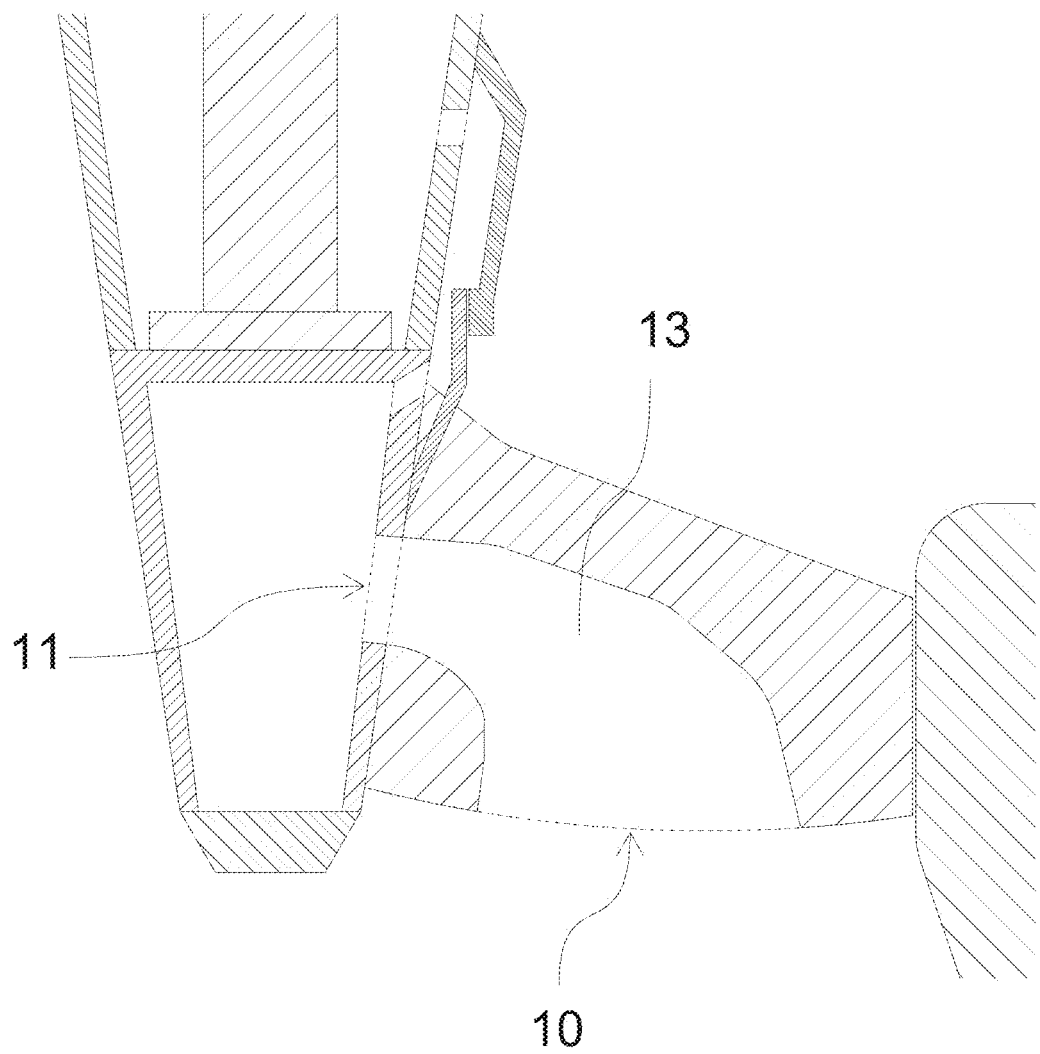
FIG. 5 is an axial flow turbine after refurbishment according to a second embodiment of the invention.

FIG. 5 displays a refurbished turbine according to another embodiment of the present invention. The third opening 10 is located according to this embodiment at the trailing edge of at least one of the blades 2. The gas is flowing to the third opening 10 through a gas passage inside the corresponding blade 2, which is designated by 13. The gas enters from inside the hub 1 into the gas passage 13 by passing an inlet aperture, which is designated by 11. Alternatively, the third opening 10 can be located at the radial periphery of the blade 2. Discharging gas at this position can mitigate cavitation and vibration.

Figure 6:
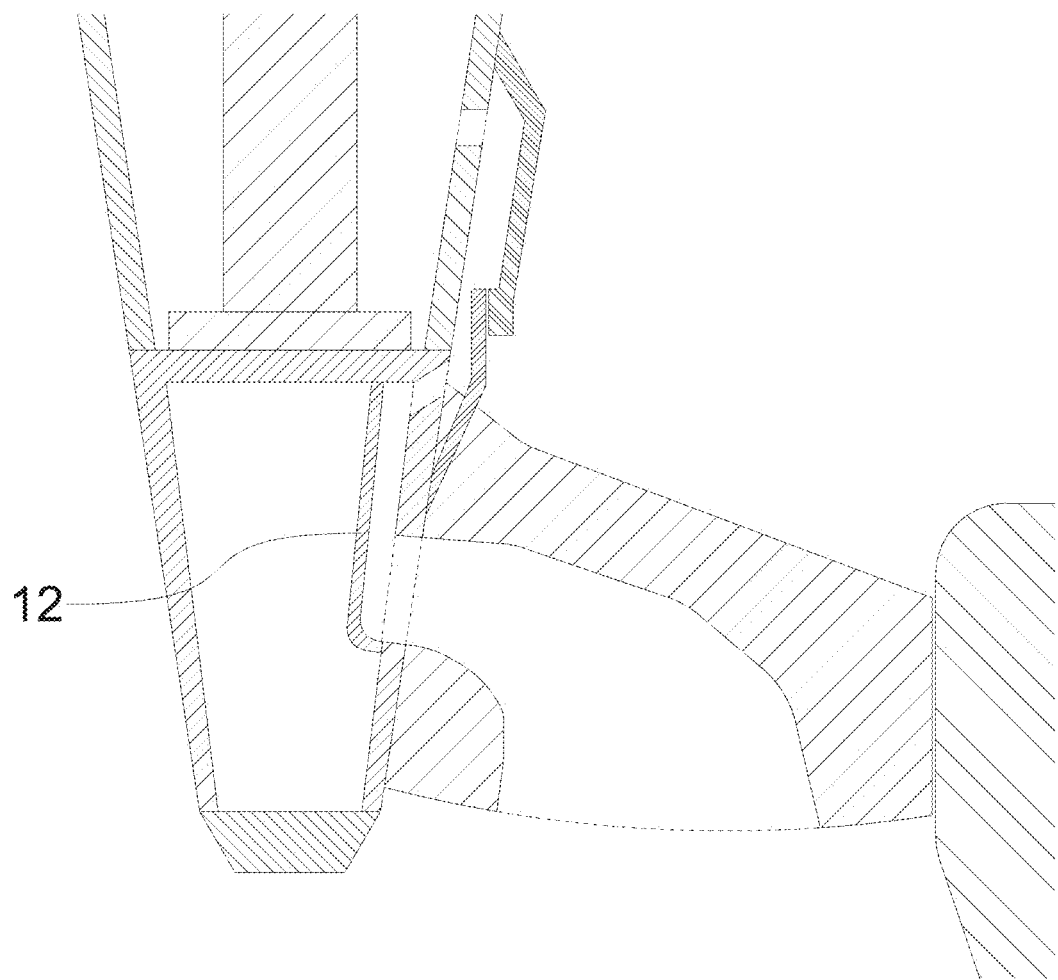
FIG. 6 is an axial flow turbine after refurbishment according to a third embodiment of the invention.

FIG. 6 displays a refurbished turbine according to another embodiment of the present invention. In addition to the embodiment according to FIG. 5 the embodiment according to FIG. 6 includes a boundary plate, which is designated by 12 and is located within the hub 1. The boundary plate 12 separates the gas flow passage within the hub 1 from the remaining space inside the hub 1. This can be useful in case the original hub 1 was filled with oil or water. In the refurbished hub the remaining space inside the hub 1 can again be filled with oil or water and the gas flow through the separated passage is not hindered by the oil or water. Alternatively, the separated gas flow passage inside the hub can be located completely in the hub shell. In this case the complete inside of the refurbished hub can again be filled with oil or water. The later alternative embodiment is especially useful for Kaplan type runners because the space inside the hub is very limited. Another alternative way to separate the gas flow passage within the hub can be achieved using one or more pipes within the hub connecting a second opening 9 with a corresponding third opening 10 or with a corresponding air inlet aperture 11. Note that a separated gas flow passage inside the hub can also be applied in case that the third opening is located at the bottom of the hub 1.

Figure 7:
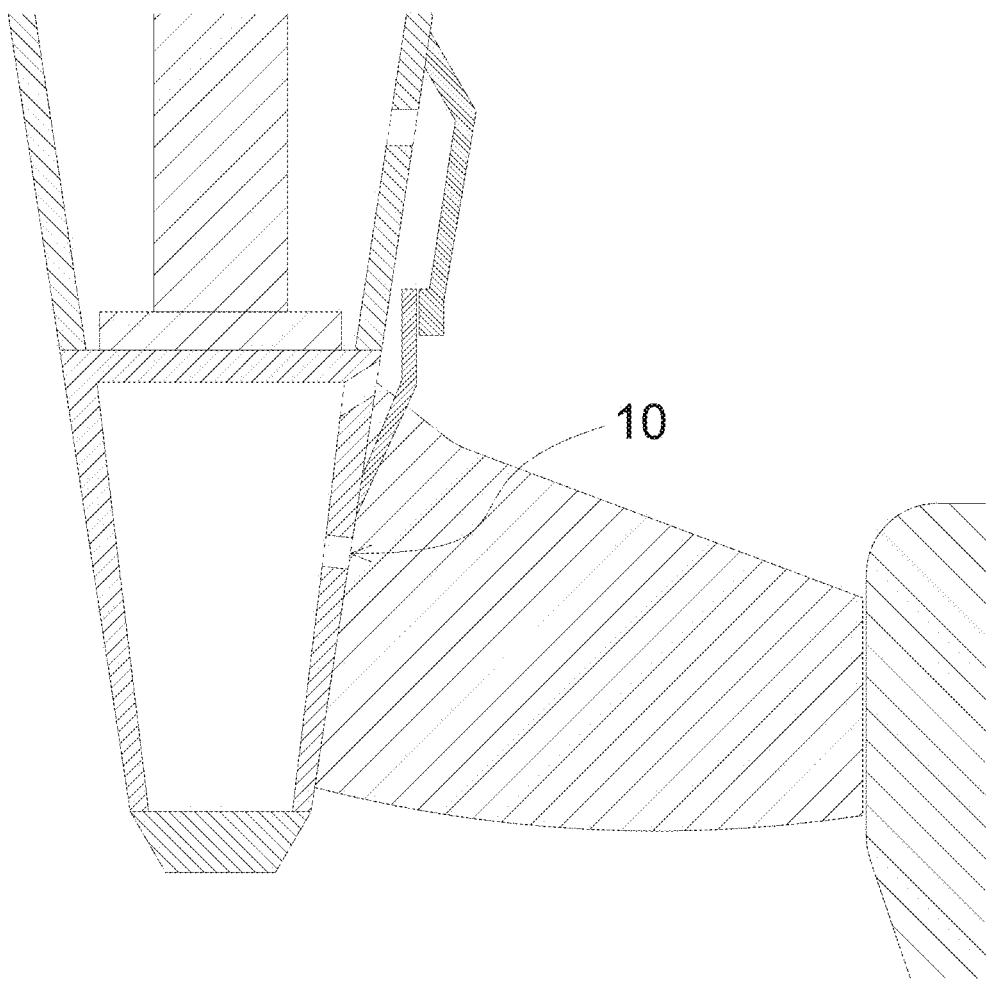
FIG. 7 is an axial flow turbine after refurbishment according to another embodiment of the invention.

FIG. 7 displays a refurbished turbine according to another embodiment of the present invention. The difference to FIG. 3 is that the third opening 10 is not located at the bottom of the hub 1 but located at the side of the hub 1 between the blades 2.

Figure 8:
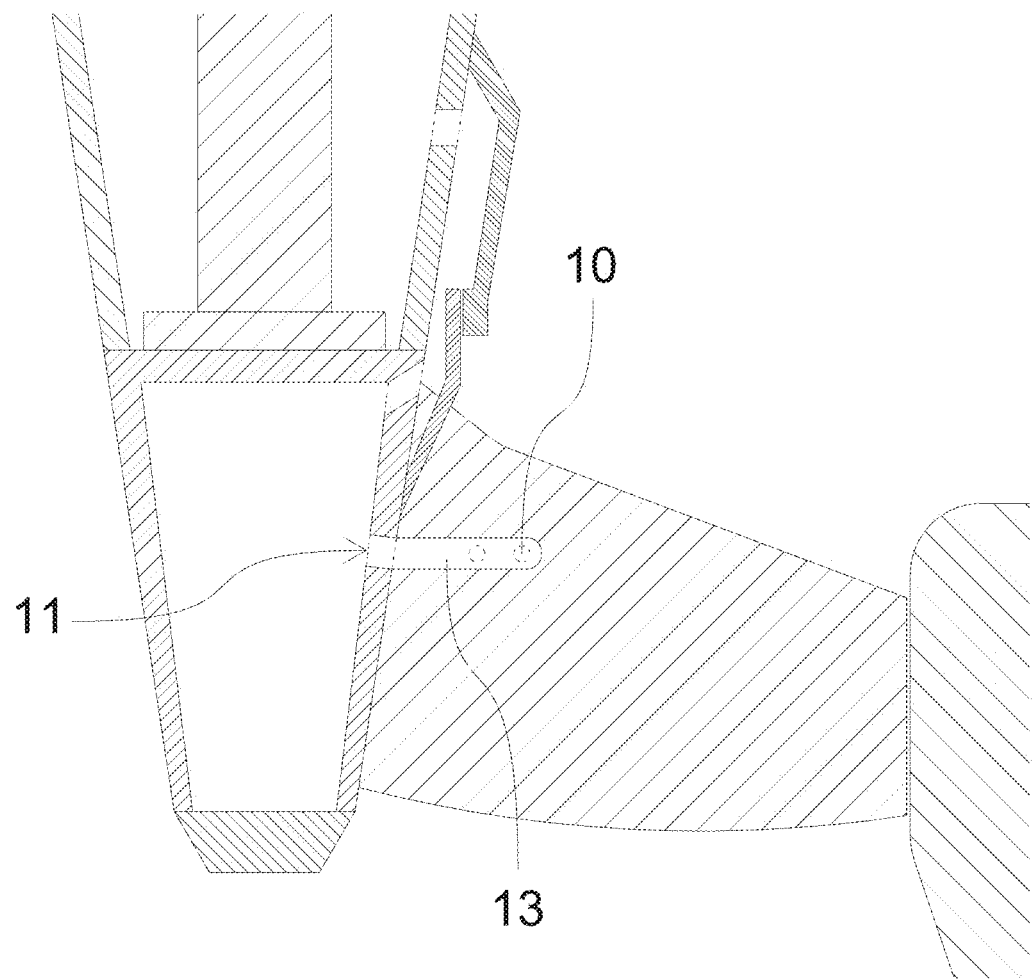
FIG. 8 is an axial flow turbine after refurbishment according to another embodiment of the invention.

FIG. 8 displays a refurbished turbine according to another embodiment of the present invention. The displayed embodiment includes two third openings 10, which are located at the suction side of a blade 2.

Figure 9:
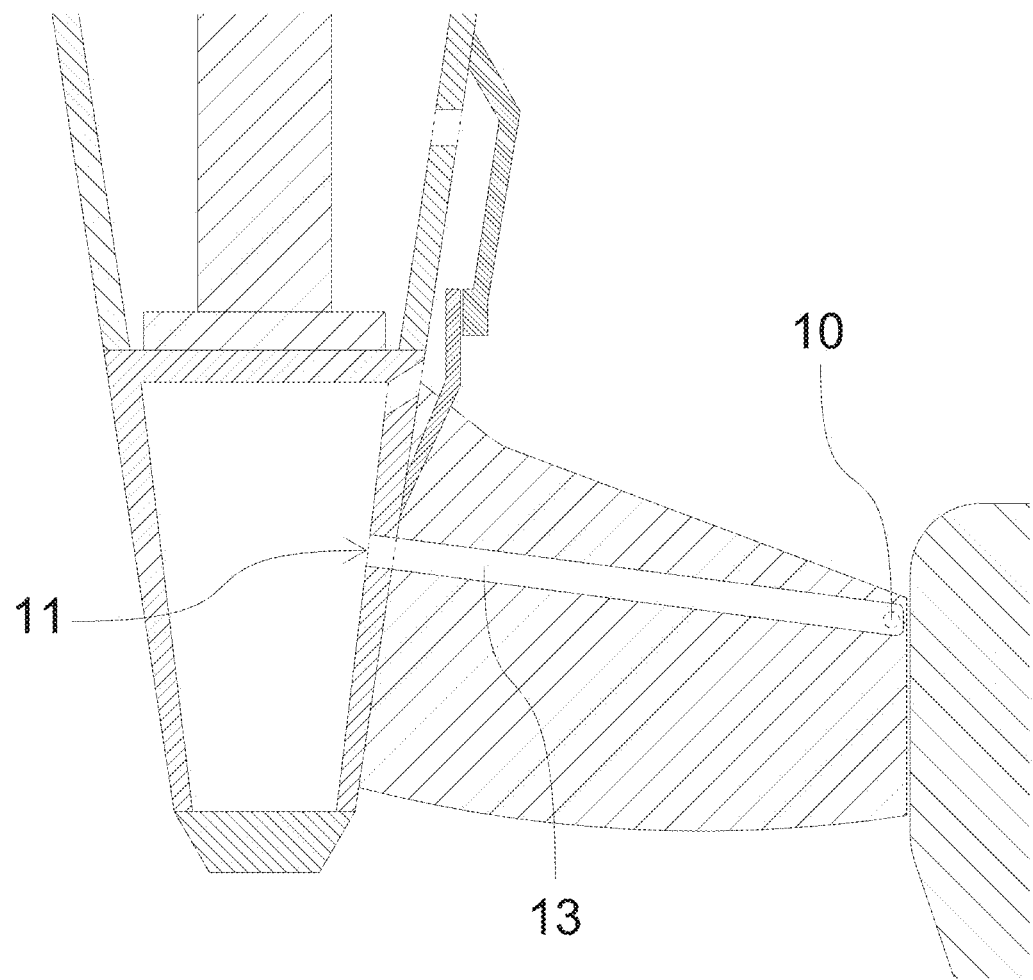
FIG. 9 is an axial flow turbine after refurbishment according to another embodiment of the invention.

FIG. 9 displays a refurbished turbine according to another embodiment of the present invention. The displayed embodiment includes a third opening 10, which is located at the periphery of a blade 2 near the leading edge of the blade 2. The opening is located at the suction side of the blade 2.

Figure 10:
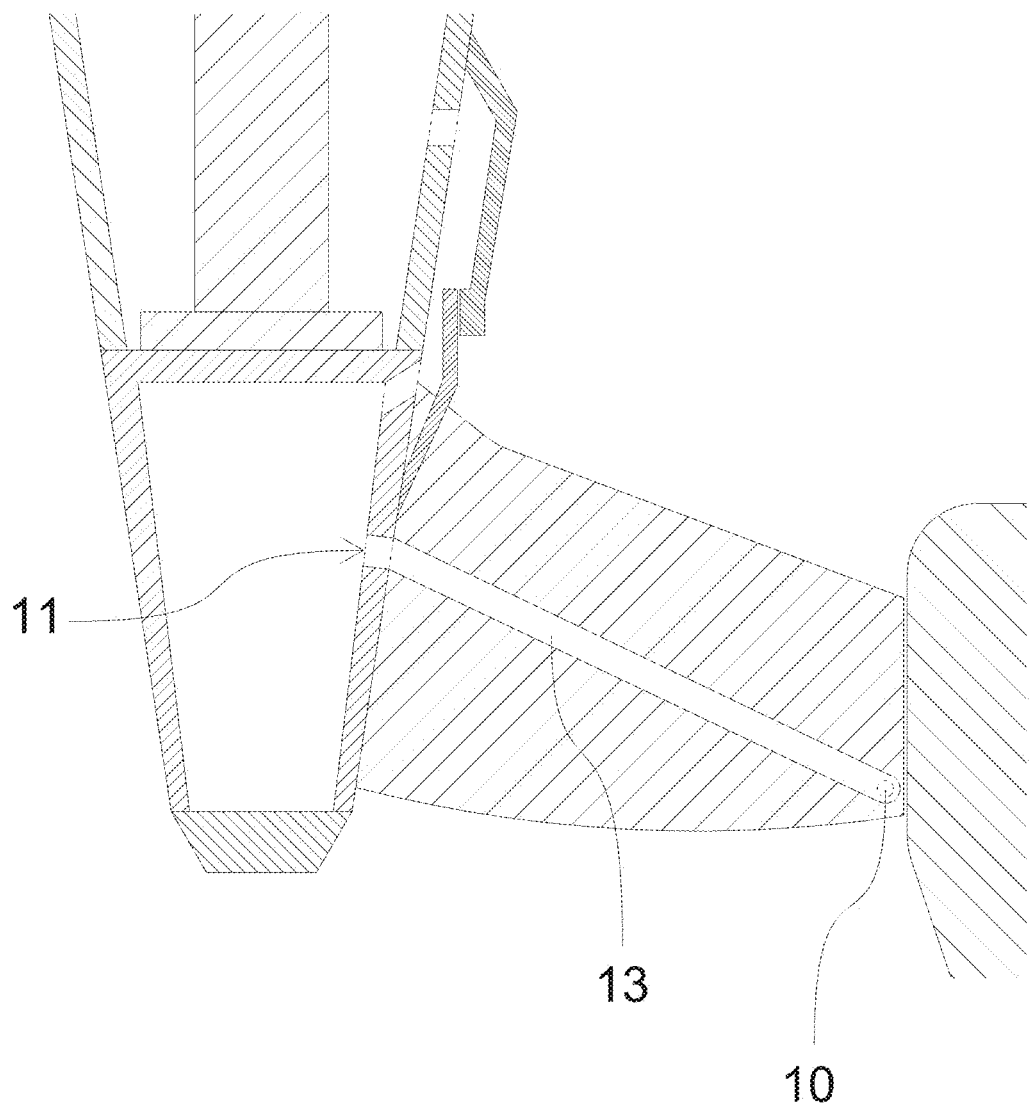
FIG. 10 is an axial flow turbine after refurbishment according to another embodiment of the invention.

FIG. 10 displays a refurbished turbine according to another embodiment of the present invention. The displayed embodiment includes a third opening 10, which is located at the periphery of a blade 2 near the trailing edge of the blade 2. The opening is located at the suction side of the blade 2.

Alternatively, the third opening 10 in the embodiments according to FIGS. 9 and 10 could be located directly at the tip of the blade 2. In this case the discharged gas would enter the water passage in the space between the blade and the boundary of the water passage.

The somewhat edged shape of the first and second cover plate 5 and 6 shown in the FIGS. 3 to 10 is just for the sake of simplicity. Of course, the contours especially at the outside of the cover plates 5 and 6 can be shaped smoother so that the adjacent water flow is not or just minimally disturbed. Also, the radial width of the annular space can be much smaller as shown in the FIGS. 3 to 10.

The method of refurbishing a facility for converting hydraulic energy into electrical energy according to the present invention includes at least the following steps:
Providing a first cover plate 5,
Providing a second cover plate 6,
Providing a first opening 8 located at the inner head cover 3,
Providing a second opening 9 located at the hub 1,
Providing a third opening 10 located at the runner,
Connecting the first cover plate 5 to the inner head cover 3,
Connecting the second cover plate 6 to the hub 1,
whereas the first cover plate 5 and the second cover plate 6 are surrounding the axis of rotation of the runner, and a part of the outer surface of the head cover 3, a part of the outer surface of the hub 1, the inner surface of the first cover plate 5, and the inner surface of the second cover plate 6 are confining an annular shaped space in order to allow gas to flow from inside the inner head cover 3 through the first opening 8, the annular shaped space, and the second opening 9 and to be discharged through the third opening 10 into the water passage of the facility during operation of the refurbished facility.

The cover plates 5 and 6 can be connected to the mentioned parts by welding or bolting. The cover plates 5 and 6 can be formed as an integral part. In this case the runner or the runner blades must be dismounted during refurbishment. The cover plates 5 and 6 can alternatively consist of several segments which can be connected by welding or bolting. Depending on the runner geometry the second cover plate 6 may include recess clearances for the runner blades. In the case of a Kaplan type runner the recess clearances must allow pivoting of the blades.

For the embodiments according to FIGS. 5, 8-10, the method of refurbishing includes the following additional steps:
Providing a gas passage 13 within a blade 2,
Providing an inlet aperture 11,
whereas the third opening 10 is located at the trailing edge or the radial periphery of the blade 2 (or other locations of the blade 2 mentioned before) including the gas passage 13, and the gas passage 13 extends between the inlet aperture 11 and the third opening 10 in order to allow the gas discharging through the third opening 10 into the water passage to flow through the gas passage 13 by passing the inlet aperture 11.

The gas flow passage 13 can be machined into an existing blade 2 by machining a shallow groove in the blade 2 and providing an overlying cover plate (compare FIG. 10 in U.S. Pat. No. 4,924,842). The cover plate can by welded or bolted to the existing blade 2.

For the embodiments mentioned in connection with FIG. 6, the method of refurbishing includes the following additional steps:

Providing a separated gas flow passage located within the hub 1, whereas the separated gas flow passage extends between the second opening 9 and the third opening 10 or the inlet aperture 11 in order to allow the gas discharging through the third opening 10 into the water passage to flow through the separated gas flow passage.

LIST OF REFERENCE SIGNS

1 Hub
2 Blade
3 Inner head cover
4 Shaft
5 First cover plate
6 Second cover plate
7 Seal
8 First opening
9 Second opening
10 Third opening
11 Inlet aperture
12 Boundary plate
13 Passage While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method of refurbishing a facility for converting hydraulic energy into electrical energy, the method comprising the steps of:
   providing:
      a first cover plate, which includes an inner surface;
      a second cover plate, which includes an inner surface;
      a first opening located at an inner head cover, which includes an outer surface;
      a second opening located at a hub, which includes an outer surface;
      a third opening located at a runner;
   connecting the first cover plate to the inner head cover;
   connecting the second cover plate to the hub, the first cover plate and the second cover plate surrounding an axis, wherein a part of the outer surface of the inner head cover, a part of the outer surface of the hub, the inner surface of the first cover plate, and the inner surface of the second cover plate confine an annular shaped space in order to allow a gas to flow from inside the inner head cover and through the first opening, the annular shaped space, and the second opening and to be discharged through the third opening into a water passage during operation of a refurbished said facility, wherein the refurbished facility includes:
      the water passage;
      a turbine including the runner of an axial flow type, the runner being located within the water passage, being moveable around the axis, belonging to a rotatable part of the turbine, and including the hub and a plurality of blades connected to the hub;
      a drive shaft connected to the runner; and
      the inner head cover, which is located adjacent to the hub, surrounds the drive shaft, and belongs to a non-rotatable part of the turbine.

2. The method according to claim 1, wherein the hub includes a bottom, the third opening being located at the bottom of the hub.

3. The method according to claim 1, wherein the hub includes a side, the third opening being located at the side of the hub between the plurality of blades.

4. The method according to claim 1, wherein the method further includes the step of providing a gas passage and an inlet aperture, the gas passage being within one of the plurality of blades, wherein the third opening is located at the blade including the gas passage, wherein the gas passage extends between the inlet aperture and the third opening in order to allow the gas discharging through the third opening into the water passage to flow through the gas passage by passing the inlet aperture.

5. The method according to claim 4, wherein the third opening is located at a trailing edge of at least one of the plurality of blades.

6. The method according to claim 4, wherein the third opening is located at a periphery of at least one of the plurality of blades.

7. The method according to claim 4, wherein the third opening is located at a suction side of at least one of the plurality of blades.

8. The method according to claim 1, wherein the method further includes the step of providing a separated gas flow passage located within the hub.

9. The method according to claim 8, wherein the separated gas flow passage extends between the second opening and the third opening in order to allow the gas discharging through the third opening into the water passage to flow through the separated gas flow passage.

10. The method according to claim 8, wherein the method further includes the step of providing a gas passage and an inlet aperture, the gas passage being within one of the plurality of blades, wherein the third opening is located at the blade including the gas passage, wherein the gas passage extends between the inlet aperture and the third opening in order to allow the gas discharging through the third opening into the water passage to flow through the gas passage by passing the inlet aperture, wherein the separated gas flow passage extends between the second opening and the inlet aperture in order to allow the gas discharging through the third opening into the water passage to flow through the separated gas flow passage.

11. A refurbished facility for converting hydraulic energy into electrical energy, the refurbished facility comprising:
   a facility that is configured for being refurbished by way of a method—so as to result in the refurbished facility—that includes the steps of:
      providing:
         a first cover plate, which includes an inner surface;
         a second cover plate, which includes an inner surface;

a first opening located at an inner head cover, which includes an outer surface;

a second opening located at a hub, which includes an outer surface;

a third opening located at a runner;

connecting the first cover plate to the inner head cover;

connecting the second cover plate to the hub, the first cover plate and the second cover plate surrounding an axis, wherein a part of the outer surface of the inner head cover, a part of the outer surface of the hub, the inner surface of the first cover plate, and the inner surface of the second cover plate confine an annular shaped space in order to allow a gas to flow from inside the inner head cover and through the first opening, the annular shaped space, and the second opening and to be discharged through the third opening into a water passage during operation of the refurbished facility, wherein the refurbished facility includes:

the water passage;

a turbine including the runner of an axial flow type, the runner being located within the water passage, being moveable around the axis, belonging to a rotatable part of the turbine, and including the hub and a plurality of blades connected to the hub;

a drive shaft connected to the runner; and the inner head cover, which is located adjacent to the hub, surrounds the drive shaft, and belongs to a non-rotatable part of the turbine.

\* \* \* \* \*